UNITED STATES PATENT OFFICE.

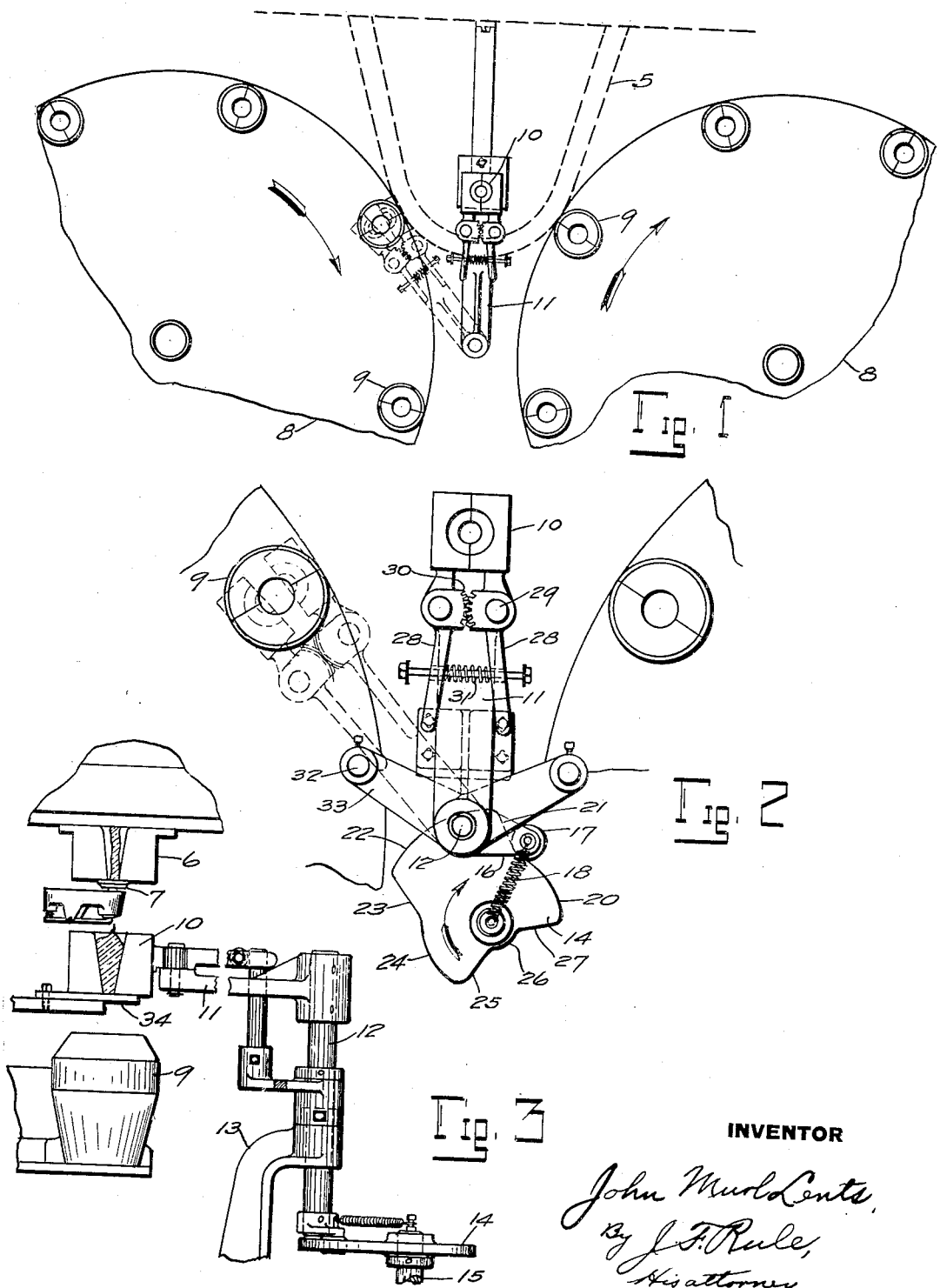

JOHN MURL LENTS, OF EVANSVILLE, INDIANA, ASSIGNOR TO THE OWENS BOTTLE MACHINE COMPANY, OF TOLEDO, OHIO, A CORPORATION OF OHIO.

APPARATUS FOR TRANSFERRING CHARGES OF MOLTEN GLASS.

1,331,512. Specification of Letters Patent. Patented Feb. 24, 1920.

Application filed May 20, 1918. Serial No. 235,476.

*To all whom it may concern:*

Be it known that I, JOHN MURL LENTS, a citizen of the United States, residing at Evansville, in the county of Vanderburg and State of Indiana, have invented new and useful Improvements in Apparatus for Transferring Charges of Molten Glass, of which the following is a specification.

My invention relates to means for transferring gobs or charges of molten glass from a glass flowing or gob forming apparatus to molds, and is particularly designed to transfer the charges supplied from a single flowing apparatus to a number of mold machines.

An object of the invention is to provide efficient and practical means for quickly transferring the gobs successively to different mold positions, while at the same time forming or maintaining the gob in suitable form for entering the mold.

In its preferred form the invention comprises a swinging arm carrying a cup or receptacle in which the charges of glass are transferred from the glass flowing apparatus to the molds. This transfer cup may be brought directly beneath a flow opening in the tank or supply chamber from which the glass is supplied. A charge of glass is then dropped into the cup from a preliminary gob forming or accumulating device, or the glass may flow directly into the transfer cup. Said arm may then be swung laterally to bring the cup over a mold on one of the machines and is automatically opened to drop the charge of glass into the mold beneath. The transfer cup is then swung back to position to receive another charge, and then swings in the opposite direction to deposit the charge in a mold on the other machine. The gobs of glass are thus alternately transferred to the two forming machines, which may be alternately rotated step by step in synchronism with the movements of the gob forming and transfer apparatus.

Referring to the accompanying drawings which illustrate a construction embodying my invention:

Figure 1 is a plan view with the transfer cup in receiving position.

Fig. 2 is a similar view on a larger scale.

Fig. 3 is a part sectional elevation of the apparatus.

The molten glass may be supplied from a continuous melting tank having a boot or extension 5 provided with a flow opening in the bottom thereof. The glass flows through said opening in a continuous stream and accumulates in a gob forming cup or receptacle 6 directly beneath the flow opening. This receptacle is preferably in the form of a divided or sectional cup, the sections of which are separated periodically to drop the accumulated masses or gobs of glass. A knife 7 operates to sever the discharged gobs from the oncoming stream and forms a temporary bottom for the cup. The parts above described may be the same as those disclosed in the co-pending application of Joseph B. Graham, Serial Number 174,697, and in themselves form no part of the present invention.

My invention provides means for transferring the gobs discharged from the cup 6 alternately to the molds of glass forming machines located adjacent to the furnace. Each of these machines comprises a mold table 8 having a series of molds 9 which are brought successively to a charging station or position to receive the gobs. The gob forming apparatus comprises the transfer cup or receptacle 10 carried on a rock arm 11, the latter fixed to a rock shaft 12. The shaft 12 is journaled in a standard 13 and is rocked by means of a cam 14 carried on a continuously rotating shaft 15. An arm 16 fixed to the rock shaft carries a cam roll 17 which is held against the cam by a spring 18. The cam is so formed that the transfer cup 10 is held stationary beneath the flow opening while it receives a charge of glass and swings alternately to the left and right to transfer the charges alternately to the two machines. To effect these operations the cam is formed with an arc or dwell surface 20 which holds the transfer cup in receiving position, a section 21 to swing the cup to the left to discharging position (shown in dotted lines, Fig. 2), a dwell portion 22 to hold the cup stationary over the mold, a section 23 to return the cup to central position, a dwell portion 24 to hold it stationary while it receives another charge, a section 25 for swinging the cup to the right, a dwell portion 26 to hold the cup over the mold at the right and a section 27 to again return the cup to receiving position, thus completing the cycle of operations.

The cup 10 is made in sections carried on arms 28, the latter mounted on pivots 29 on the rock arm 11 and having intermeshing gear teeth 30. The cup is held closed by a spring 31. As the cup swings to either discharging position over a mold, one of the arms 28 engages a stop 32, thereby rocking the arm about its pivot and through the gear teeth 30, imparting equal rocking movement to the other arm 28, thus opening the cup as indicated in broken lines. This permits the charge to drop into the mold beneath. The stops 32, as shown, are carried on arms 33 supported on the bracket 13. If preferred, such stops may be carried on the mold tables 8.

In practice the charges of glass accumulate in the cup 6 which is shaped to give the gobs a suitable form for entering the mold. These gobs are dropped into the transfer cup beneath. There may be more or less of a stream flow directly into the transfer cup after a gob has dropped therein and before the knife 7 operates to sever it from the oncoming stream.

The interior walls of the transfer cup 10 are upwardly flared or inclined, as shown, the cup being open at top and bottom. The cavity or chamber in this cup is substantially the same shape as that of the cup 6 so that the gob of glass when dropped into the transfer cup does not materially change its shape. While the cup 10 is in receiving position the bottom thereof may be closed by a stationary plate 34. As the cup swings away from the charging position and beyond the plate 34, the glass is permitted to protrude or sag downward below the bottom of the cup. The lower surface of the gob, which has been more or less cooled or chilled by said plate, is reheated from the interior of the mass and is thus in proper condition for taking the shape of the mold into which it is dropped. If the bottom opening of the transfer cup is not too large the bottom plate 34 may be omitted entirely. The transfer cup serves to form the charge into a suitably shaped gob for entering the mold; or if the gob has been formed before entering the transfer cup, it is retained in shape by said cup until dropped into the mold.

The invention is not limited to use with the particular form of apparatus herein shown for supplying the glass to the transfer cup. Although the apparatus as herein shown is designed for transferring glass to two intermittently rotating machines, such showing is merely illustrative, and not to be taken as indicating the limit either of the number or type of machines to which the invention may be adapted.

Variations may be resorted to within the spirit and scope of my invention.

What I claim is:

1. The combination with means for flowing glass, of means for accumulating and shaping the glass into formed masses, a glass forming machine comprising molds, a transfer receptacle into which said means are discharged, and automatic means for operating said receptacle to transfer said masses and drop them into the molds.

2. The combination of a plurality of glass forming machines each comprising a series of molds, means for flowing molten glass, a transfer receptacle to receive said glass, and means for actuating said receptacle to carry charges of glass alternately to said machines.

3. The combination with a supply chamber for containing molten glass and provided with an opening through which the glass is discharged, of two series of receptacles to receive the charges, a transfer cup, and means to bring the cup periodically beneath said discharge opening to receive said charges and for moving it from charge receiving position alternately to positions to drop the charges into receptacles of the respective series.

4. The combination with means for supplying a flow of molten glass, of means for segregating the glass into individual masses, a glass forming machine comprising a series of molds, and a transfer cup arranged to receive said charges and transfer them to a position over the molds and drop them into the molds.

5. The combination with means for segregating flowing molten glass into individual masses or charges, of a transfer cup arranged to receive said charges, and means for moving said cup from receiving position in which it receives said charges, to different discharging positions and discharging its charges at said positions, the cup being moved alternately from receiving position to the several discharging positions to supply charges to the discharging positions in succession.

6. The combination of a transfer cup or receptacle for transferring charges of molten glass, automatic means for moving the cup from a receiving position alternately to different discharging positions, and automatic means to open said cup at each discharging position and discharge the glass.

7. The combination with glass forming machines comprising molds, of means for flowing molten glass, a sectional cup movable into position to receive the glass, means to swing said cup with a charge of glass therein in opposite directions alternately from said receiving position to discharging positions over molds on the respective machines, and automatic means operable as the cup is brought to a discharging position, to separate the cup sections and drop the charge from said cup into the mold beneath.

8. The combination with rotary glass forming machines located side by side and each comprising a ring of molds, of glass flowing apparatus between said machines, a transfer cup to receive individual charges of glass, and means to swing said cup laterally in opposite directions alternately from charge receiving position into positions to drop the charges alternately into the molds on said machines.

9. The combination with rotary glass forming machines located side by side and each comprising a ring of molds, glass flowing apparatus between said machines, a transfer cup to receive charges of glass, means to swing said cup laterally into positions to drop the charges alternately into the molds on said machines, said cup comprising separable sections, and automatic means to separate said sections and drop the charge of glass as the cup is brought to discharging position.

10. The combination with a glass machine having forming molds, of means for flowing molten glass, a transfer cup comprising separable sections, and open at its top and bottom, means for introducing charges of molten glass into the cup through said open top, and means for moving said cup from its receiving position to a position over a mold and separating the sections to drop the charge into the mold therebeneath, said cup having walls flared upwardly from bottom to top to provide a wide mouth to receive the glass while the tapered walls temporarily support the glass without permitting it to drop through said open bottom, the latter permitting the glass to sag downward through said open bottom prior to its discharge.

11. The combination with means for flowing glass, of an accumulating receptacle in which the glass is accumulated and formed into a gob, a transfer cup beneath and spaced from said receptacle and similar in form to said receptacle, whereby the gob may be dropped into the transfer cup without substantial change in form, means to disconnect the gob from the glass which forms the succeeding gob before the cup is removed from its receiving position, and means for actuating said cup to transfer the gob and discharge it into a mold.

12. The combination of means to supply individual charges of molten glass from a mass, a transfer receptacle to receive the charges, and means to move said receptacle with a charge therein from charge receiving position to different discharge positions alternately.

Signed at Evansville, in the county of Vanderburg and State of Indiana, this 6th day of May, 1918.

JOHN MURL LENTS.